United States Patent [19]

Kuehne

[11] Patent Number: 4,852,652

[45] Date of Patent: Aug. 1, 1989

[54] CHEMICAL FLOODING WITH IMPROVED INJECTIVITY

[75] Inventor: Donald L. Kuehne, Orange, Calif.

[73] Assignee: Chevron Research Company, San Francisco, Calif.

[21] Appl. No.: 197,929

[22] Filed: May 24, 1988

[51] Int. Cl.$^4$ .............................................. E21B 43/22
[52] U.S. Cl. ...................................... 166/270; 166/91; 166/274; 166/275; 252/8.554
[58] Field of Search ................ 166/75.1, 91, 270, 273, 166/274, 275, 300, 305.1; 252/8.554

[56] References Cited

U.S. PATENT DOCUMENTS

| | | | |
|---|---|---|---|
| 2,827,964 | 3/1958 | Sandiford et al. | 166/274 |
| 3,208,518 | 7/1961 | Patton . | |
| 3,502,146 | 3/1970 | Hurd | 166/270 |
| 3,743,018 | 7/1973 | Norton et al. | 166/275 |
| 3,768,560 | 10/1973 | Hill et al. | 166/274 |
| 3,825,067 | 7/1974 | Vestal | 166/275 |
| 3,827,499 | 8/1974 | Norton et al. | 166/305.1 |
| 3,841,399 | 10/1974 | Ryan | 166/300 |
| 3,842,909 | 10/1974 | Rhudy et al. | 166/274 X |
| 3,888,309 | 6/1975 | Rhudy et al. | 166/274 |
| 3,927,716 | 12/1975 | Burdyn et al. | 166/270 |
| 3,977,470 | 8/1976 | Chang | 166/273 |
| 4,040,484 | 8/1977 | Hessert | 166/294 |
| 4,049,054 | 9/1977 | Wier | 166/275 X |
| 4,249,608 | 2/1981 | Carter | 166/275 |
| 4,282,930 | 8/1981 | Grodde et al. | 166/274 X |
| 4,291,765 | 9/1981 | Gilchrist et al. | 166/273 |
| 4,409,110 | 10/1983 | Borchardt et al. | 252/8.554 |
| 4,447,342 | 5/1984 | Borchardt et al. | 252/8.554 |
| 4,493,371 | 1/1985 | Reisberg et al. | 166/274 |
| 4,510,993 | 4/1985 | Luetzelschwab | 166/75.1 |
| 4,574,885 | 3/1986 | Horton | 166/270 |
| 4,638,865 | 1/1987 | Ball et al. | 166/274 |
| 4,653,584 | 3/1987 | Ball et al. | 166/273 |
| 4,667,740 | 5/1987 | Maddox, Jr. | 166/273 X |
| 4,709,759 | 12/1987 | Bock et al. | 166/275 |

FOREIGN PATENT DOCUMENTS

| | | | |
|---|---|---|---|
| 1142336 | 3/1983 | Canada | 252/8.554 |
| 2132664 | 7/1984 | United Kingdom . | |

OTHER PUBLICATIONS

SPE of AIME Rocky Mountain Regional Meeting Preprint No. SPE-5339, 8 pp., 1975.

Primary Examiner—George A. Suchfield
Attorney, Agent, or Firm—S. R. LaPaglia; E. J. Keeling; E. A. Schaal

[57] ABSTRACT

A caustic waterflooding process for enhanced oil recovery from a production well is disclosed comprising injection of an aqueous solution under pressure to sweep oil to the production well. That aqueous solution comprises a caustic and a polymer that has an intrinsic viscosity that is at least twice as high in its hydrolyzed form than in its unhydrolyzed form, wherein the polymer is injected with less than 15% of polymer being hydrolyzed. The aqueous solution contains from 100 to 5,000 ppm of polymer and 100 to 50,000 ppm of caustic. Such solutions have improved injectivity and good efficiency in recovering oil from underground formations.

Preferably, the polymer is injected with from 5% to 10% of polymer being hydrolyzed. That polymer is preferably a polyacrylamide (such as a polyacrylamide homopolymer, a polymethylacrylamide homopolymer, or a copolymer of acrylamide and monomers selected from the group consisting of methylacrylamide, N-alkyl-substituted acrylamides, alkylacrylates, and acrylic acids).

11 Claims, 3 Drawing Sheets

CHEMICAL FLOODING WITH IMPROVED INJECTIVITY

The present invention relates to a caustic waterflooding process for enhanced oil recovery.

BACKGROUND OF THE INVENTION

Polyacrylamide polymers are mixed with aqueous chemical solutions to increase that solution's viscosity in a reservoir. These polymer solutions are more efficient in recovering trapped oil than solutions without polymers. A problem with using polyacrylamides is that they significantly reduce the solution injection rates into the reservoir. These lower injection rates delay oil recovery and raise recovery cost.

Several methods toward improving injectivity have been proposed: (1) using higher salinity brines (see U.S. Pat. No. 3,827,499), (2) using lower molecular weight polymers (see P. J. Shuler, D. L. Kuehne, J. T. Uhl, and G. W. Walkup, Jr.: "Improving Polymer Injectivity at West Coyote Field, California," SPE Reservoir Engineering (August 1987) 2, 271–280), and (3) preshearing the polymer solution (see Shuler et al.). While these three methods are useful, still better injectivity is needed.

SUMMARY OF THE INVENTION

The present invention describes a method for improving injectivity in a chemical flooding process that uses polymers for mobility control. The method is based on two properties of polyacrylamides. First, their viscosity depends on their degree of hydrolysis. An unhydrolyzed polyacrylamide (0 to 15% hydrolyzed) has one-third to one-half the viscosity of typical commercial polyacrylamides (30% to 50% hydrolyzed). Second, at higher temperatures, they react with caustic and are hydrolyzed, as disclosed in U.S. Pat. No. 3,825,067, which is incorporated herein by reference for all purposes.

The present invention involves injecting a solution of from 100 to 5,000 ppm unhydrolyzed polyacrylamide and from 100 to 50,000 ppm caustic into a reservoir. Preferably, only from 5% to 10% of the injected polymer is hydrolyzed. Near the wellbore, where the flow resistance is highest, the solution viscosity will be low. At reservoir temperatures of 75° to 200° F., the caustic reacts with the polymer, causing its viscosity to increase over a 24 hour period. By the time the solution has reached its maximum viscosity, it will have moved away from the wellbore.

BRIEF DESCRIPTION OF THE DRAWINGS

In order to facilitate the understanding of this invention, reference will now be made to the appended drawings of preferred embodiments of the present invention. The drawings are exemplary only, and should not be construed as limiting the invention.

DETAILED DESCRIPTION OF THE PREFERRED EMBODIMENTS

Figure 1:
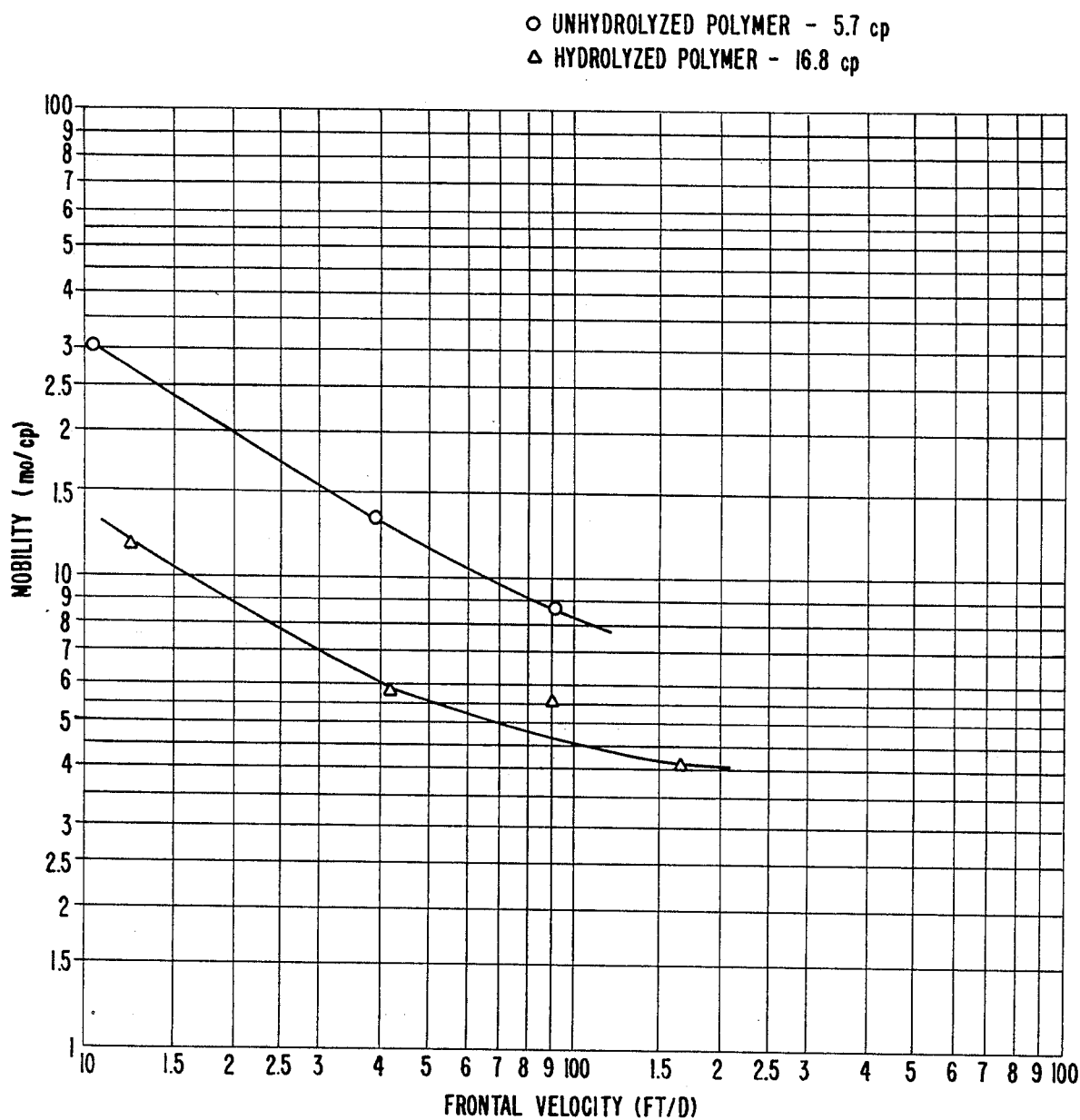
FIG. 1 is a plot of mobility for polymer solutions in a Berea core entitled "Mobility of 2000 ppm Alcoflood 815L Solutions in a Berea Core".

The present invention relates to a caustic waterflooding process. By "waterflooding", we mean pumping water into the formation around an oil well in order to displace the oil.

In its broadest aspect, the present invention uses an aqueous solution in caustic waterflooding. That solution comprises caustic and an unhydrolyzed polymer that has an intrinsic viscosity that is at least twice as high in its hydrolyzed form than in its unhydrolyzed form.

Polymer

When injected, less than 15% of the polymer is hydrolyzed. Preferably, the degree of hydrolysis is from 5% to 10%. The 5% to 10% hydrolyzed polymer has a low level of adsorption on reservoir sand. Due to this low adsorption level, the 5% to 10% hydrolyzed polymer is preferred over less hydrolyzed polymers.

Useful polymers are those that have intrinsic viscosities that are at least twice as high in their hydrolyzed forms than in their unhydrolyzed forms. By "intrinsic viscosity" we mean the limiting value of viscosity at infinite dilution of the specific volume of a polymer, referred to its concentration. By "hydrolyzed form", we mean the form of a polymer after it has undergone hydrolysis (chemical decomposition involving splitting of a bond and adding the elements of water). By "unhydrolyzed form", we mean the form of a polymer that has not undergone hydrolysis.

The preferred polymer is polyacrylamide. By "polyacrylamide", we mean a polyamide of acrylic acid. Suitable polyacrylamides include homopolymers of polyacrylamide or polymethylacrylamide, or copolymers of acrylamide and monomers, such as, N-alkyl-substituted acrylamides, alkylacrylates, and acrylic acids. Preferably, the polymer is a substantially linear homopolymer or copolymer of acrylamide or methacrylamide. By "substantially linear," we mean that the polymer is substantially free of crosslinking between the polymer chains.

Linear polyacrylamides can be prepared by known methods. For example, they can be polymerized in aqueous mediums, in the presence of a small but effective amount of a water-soluble oxygen-containing catalyst at a temperature between about 30° C. and 80° C. One such catalyst is a thiosulfate or bisulfate of potassium or sodium hydroperoxide. The resulting polymer is recovered from the aqueous medium and is ground to the desired particle size. A preferred particle size is such that about 90 weight percent will pass through a No. 10 mesh sieve, and not more than about 10 weight percent will be retained on a No. 200 mesh sieve (U.S. Bureau of Standards Sieve Series).

Useful copolymers include the water-dispersible copolymers that result from polymerizing a major proportion of acrylamide or methacrylamide and a minor proportion of an ethylenically unsaturated monomer copolymerizable therewith. Sufficient acrylamide or methacrylamide should be present in the monomer mixture to make the copolymer water-dispersible. For example, one copolymer contains from 90 to 99 percent acrylamide. Useful monomers include acrylic acid, methacrylic acid, vinyl sulfonic acid, vinyl benzyl sulfonic acid, vinyl benzene sulfonic acid, vinyl acetate, acrylonitrile, methylacrylonitrile, vinyl ether, vinyl chloride, maleic anhydride, and the like. Various methods are known in the art for preparing such copolymers, e.g., see U.S. Pat. Nos. 2,625,529; 2,740,522, 2,729,557, 2,831,841; and 2,909,508, which are incorporated herein by reference for all purposes.

Polyacrylic acids can also be used. Such polyacrylic acids, including polymethacrylic acid, can be prepared by methods known in the art.

Polyacrylates can also be used. Such polyacrylates are described in Kirk-Othmer, "Encyclopedia of Chemical Technology," Vol. 1, second edition, pages 305 et seq., Interscience Publishers, Inc., New York (1963). Useful polymers include methylacrylate, ethylacrylate, N-propylacrylate, isopropylacrylate, N-butylacrylate, isobutylacrylate, tert-butylacrylate, and N-octylacrylate.

Polymers of N-alkyl-substituted acrylamides can also be used. In such polymers, the nitrogen atoms and the carboxamide groups can have from 1 to 2 alkyl substituents which contain from 1 to 4 carbon atoms. Examples include N-methylacrylamide, N-propylacrylamide, N-butylacrylamide, N-dimethylacrylamide, and N-methyl-N-secbutylacrylamide.

Caustic Solution

The caustic can be an alkali hydroxide, carbonate, or silicate, such as NaOH, $Na_2CO_3$, or $Na_4SiO_4$. The kinetics of alkaline hydrolysis at 105° F. are rapid in NaOH solutions (pH of about 13), reaching completion in 24 hours, but are much slower in the lower-pH $Na_2CO_3$ solutions (pH of about 11.5), reaching completion after five to ten days. The concentration of caustic in the aqueous solution should be from 100 to 50,000 ppm.

In a high temperature reservoir (greater than 160° F.), polyacrylamides will hydrolyze at near neutral pH. That is, they will hydrolyze without the addition of caustic. In the neutral-pH environment, the rise in viscosity will take longer, allowing even more movement away from the wellbore.

Surfactant

The aqueous solution can further comprise at least one surfactant. By "surfactant", we mean a surface-active substance that alters the interfacial tension between oil and water. Such surfactants are well known in the art.

Flow Restriction

Prior to injecting the aqueous solution, that solution can be sheared through a flow restriction means, such as an orifice. By "flow restriction means", we mean a device for restricting the flow of a fluid. This flow restriction means reduces the flow resistance of the solution without substantially reducing the viscosity.

In one embodiment, the aqueous solution comprises NaOH, a 5% to 10% hydrolyzed polyacrylamide homopolymer, and at least one surfactant. The injection of the aqueous solution can be followed with a waterflood.

EXAMPLES

The invention will be further illustrated by the following examples which set forth particularly advantageous method and composition embodiments. While the examples are provided to illustrate the present invention, they are not intended to limit it.

Three commercially available polymers with low degrees of hydrolysis were mixed in a 1% NaCl brine containing 0.75% NaOH and stored at 120° F. The polymer concentration was 2000 ppm. The viscosities of these solutions were measured initially and after 24 and 41 hours. The data in Table I show that the viscosities increase approximately 1.5 to 3 times during the first 24 hours. There were insignificant changes between 24 and 41 hours.

TABLE I

| Polymer Viscosity Data | | | | | |
|---|---|---|---|---|---|
| | | Degree of | Viscosity (cp) | | |
| Polymer | Supplier | Hydrolysis | Initial | 24 hr | 41 hr |
| Polydia PDA 1620 | Nitto | 6.5% | 14.2 | 24.2 | 24.5 |
| Nal-FLo 3815 | Nalco | 9.0% | 14.6 | 25.4 | 24.6 |
| Alcoflood 815L | Allied Colloids | 0% | 5.0 | 16.7 | 16.4 |

Next, freshly prepared and hydrolyzed solutions of the Alcoflood 815L polymer were pumped through a 1"×3" fired Berea core at different rates. The core had an initial brine permeability of 217 md. Mobility data for the two solutions are plotted in FIG. 1. At low flow rates, the mobility of the unhydrolyzed polymer solution is about three times that of the hydrolyzed solution. At high flow rates, it is only 1.8 times larger. The decrease in mobility with flow rate is due to the viscoelasticity of the polymer. Preshearing the polymer, as discussed above, would reduce the viscoelastic effect.

These results clearly show that the unhydrolyzed polymer solution has a higher mobility at all flow rates and therefore could be injected faster into a reservoir.

Kinetics of Polymer Hydrolysis

In another study, the kinetics of alkaline hydrolysis was studied for two experimental liquid emulsion products from Dow Chemical Company:

1. XD30056.02, a polyacrylamide homopolymer with 0% hydrolysis.
2. XD30290.01, an acrylamide-acrylate copolymer equivalent to 10% hydrolyzed polyacrylamide.

The polymers were mixed in a softened field injection water (about 10,900 ppm TDS) with either 1.0 wt % NaOH or 1.32 wt % $Na_2CO_3$ and 300 ppm formaldehyde. Solutions containing 3000 ppm polymer were prepared with alkaline brines preheated to 105° F. Dow inverting surfactant DPC-373-148-2 was added to the brines (1 part for every 10 parts of polymer emulsion) to ensure complete inversion of the emulsions. Both of the emulsion products have an active polymer concentration of about 33 wt%. All solutions were stored in sealed glass jars in an oven at 105° F.

Figure 2:
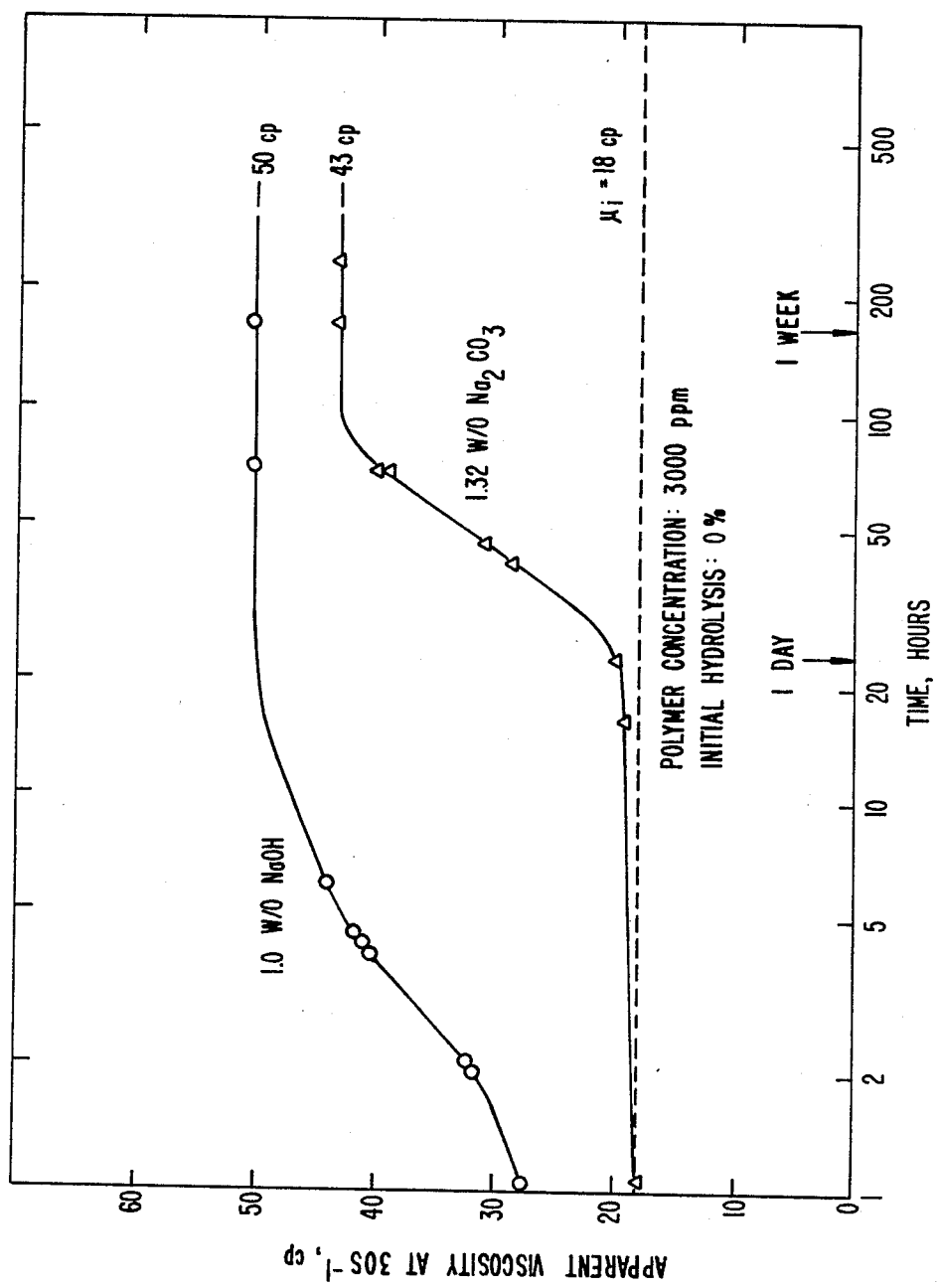
FIG. 2 is a plot of the results of hydrolysis for Dow Chemical polymer XD30056.02 entitled "Hydrolysis of Dow XD30056.02 Polymer in the Presence of Alkali at 150° F."
Figure 3:
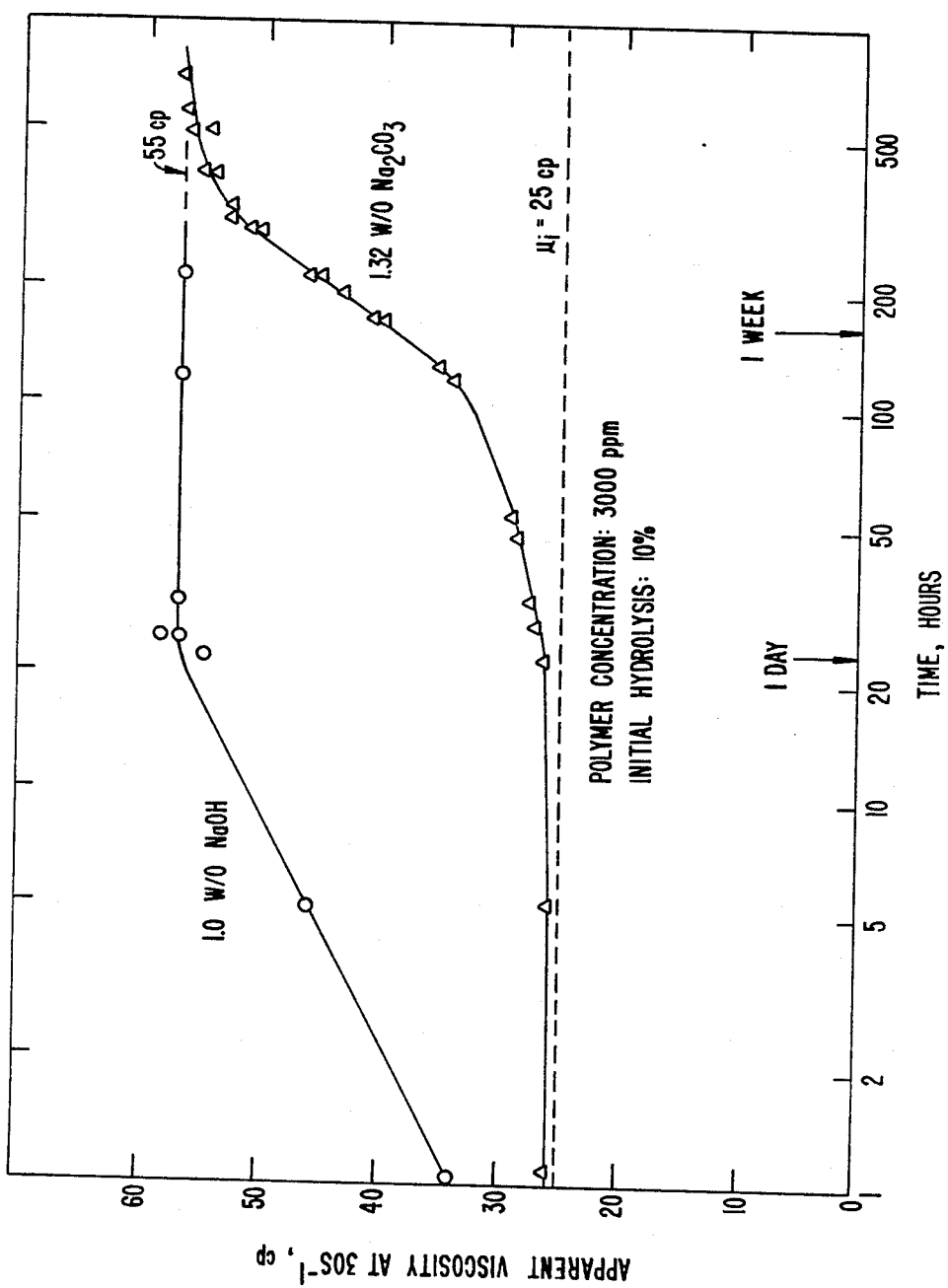
FIG. 3 is a plot of the results of hydrolysis for Dow Chemical polymer XD30290.01 entitled "Hydrolysis of Dow XD30290.01 Polymer in the Presence of Alkali at 150° F."

The variable used to gauge the extent of alkaline hydrolysis was the apparent viscosity, measured with a Haake CV-100 Rotovisco viscometer at a shear rate of 30 $s^{-1}$ and a temperature of 105° F. The results of the hydrolysis reaction in 1.0 wt% NaOH and 1.32 wt% $Na_2Co_3$ are shown in FIGS. 2 and 3 for polymers XD30056.02 and XD30290.01, respectively. Both polymers hydrolyzed rapidly in the high-pH NaOH solutions, with significant hydrolysis occurring within one hour of reaction time. Maximum viscosities were attained within 24 hours. The homopolymer solution viscosity increased from 18 cp to 50 cp; whereas, the 10% acrylate copolymer solution viscosity increased from 25 cp to 56 cp.

The hydrolysis reaction is much slower in the lower-pH (about 11.5) Na$_2$CO$_3$ solutions. For both polymers, very little hydrolysis occurred in the first 24 hours and maximum viscosities were attained only after 5 days or more. The homopolymer solution viscosity increased from 18 cp to 43 cp; whereas, the copolymer solution viscosity increased from 25 cp to 56 cp.

FIGS. 2 and 3 show that the apparent viscosity of unhydrolyzed polyacrylamide solutions can be more than doubled via alkaline hydrolysis. Moreover, the kinetics of alkaline hydrolysis, especially in buffered Na$_2$CO$_3$ solutions, suggest that such a process, with proper design, could be used to increase injectivity for alkaline/polymer EOR projects.

Polymer Adsorption

Polymer adsorption on reservoir rock is an important consideration in polymer selection. Previous work by McKennon (U.S. Pat. No. 3,039,539) found that polyacrylamide adsorption on a Miocene sand is a strong function of the degree of hydrolysis with the unhydrolyzed polyacrylamide adsorbing strongly (>500 µg/g rock), minimum adsorption (ca., 50 µg/g) near 30% hydrolysis, and slightly increasing adsorption with further hydrolysis. The experiments described below were run to confirm that data.

Polymer adsorption on reservoir sand was estimated with static bottle test experiments. Polymer solutions (1000 ppm and 2600 ppm) were contacted with toluene-extracted reservoir sand at liquid-solid ratios from 1 to 4 grams of solution per gram of sand. Formaldehyde (300 ppm) was added to all solutions to prevent microbiological activity. The bottles were equilibrated at 105° F. for four days. Polymer concentration was measured by a turbidimetric method. Adsorption was calculated from the solution concentration difference. Results are shown in Table II.

TABLE II

Dow Polyacrylamide Adsorption on Reservoir Sand at 105° F.

| Liquid/Solid Ratio (g/g) | Concentration (Initial) (ppm) | (Final) (ppm) | Adsorption (µg/g rock) | (lb/acre-ft)+ |
|---|---|---|---|---|
| (A) 1. | 990. | 654 | 350 ± 30 | 1750 ± 130 |
| 1. | 990. | 535 | 460 ± 20 | 2310 ± 120 |
| 2. | 990. | 776 | 420 ± 40 | 2140 ± 220 |
| 2. | 990. | 689 | 610 ± 40 | 3080 ± 220 |
| 3. | 990. | 782 | 640 ± 70 | 3230 ± 340 |
| 4. | 990. | 844 | 600 ± 90 | 3010 ± 430 |
| 1. | 2600. | 2279 | 340 ± 60 | 1700 ± 290 |
| 1. | 2600. | 2184 | 440 ± 60 | 2200 ± 300 |
| (B) 1. | 1000. | 929 | 74 ± 20 | 370 ± 110 |
| 1. | 1000. | 844 | 160 ± 20 | 820 ± 110 |
| 2. | 1000. | 986 | (30 ± 40)* | (150 ± 210) |
| 2. | 1000. | 975 | (50 ± 40)* | (260 ± 200) |
| 3. | 1000. | 976 | (74 ± 60)* | (370 ± 300) |
| 1. | 2600. | 2336 | 280 ± 60 | 1400 ± 290 |
| 1. | 2600. | 2348 | 260 ± 60 | 1300 ± 280 |

(A) Dow XD 30056.02 polyacrylamide (homopolymer)
(B) Dow XD 30290.01 polyacrylamide (10% acrylic acid copolymer) in softened field water with 300 ppm formaldehyde.
*concentration difference too small for accurate calculation.
+for grain density = 2.65 g/cm$^3$ and porosity = 0.3.

At an initial concentration of 990 ppm, the unhydrolyzed polymer (XD30056.02) adsorption ranged from 400 to 600 µg/g with an average of about 500 µg/g rock. With an initial concentration of 2600 ppm, adsorption was reduced slightly to about 400 µg/g rock (about 2000 lb/acre-ft). However, the unhydrolyzed polymer adsorbs so strongly on the reservoir sand that any perceived benefits of increased injectivity may be nullified by increased polymer retention.

Adsorption of the slightly hydrolyzed (10% acrylate) polyacrylamide (XD30290.01) ranged from 50 to 150 µg/g rock with an initial concentration of 1000 ppm. However, at the higher initial concentration of 2600 ppm, adsorption was 270 µg/g rock (1350 lb/acre-ft).

Thus, the slightly hydrolyzed polyacrylamide is a better candidate for injectivity improvement via the alkaline hydrolysis process.

Due to experimental difficulties in preparing useful standards, no alkali was added to the polymer solutions that were used in the adsorption study. We suspect that adsorption of the anionic polymer molecules will be reduced in a high-pH environment due to an increase in the negative surface charge of most reservoir minerals.

While the present invention has been described with reference to specific embodiments, this application is intended to cover those various changes and substitutions which may be made by those skilled in the art without departing from the spirit and scope of the appended claims.

What is claimed is:

1. A caustic waterflooding process for enhanced oil recovery from a production well comprising injecting an aqueous solution under pressure into an injection well to sweep oil to the production well, said aqueous solution comprising:
   a. a caustic; and
   b. a polymer that has an intrinsic viscosity that is at least twice as high in its hydrolyzed form than in its unhydrolyzed form, wherein said polymer is selected from the group consisting of a polyacrylamide homopolymer and a polymethylacrylamide homopolymer, wherein said polymer is injected with less than 15% of polymer being hydrolyzed; wherein said polymer is hydrolyzed in situ by said caustic.

2. The process according to claim 1 wherein said polymer is injected with from 5% to 10% of polymer being hydrolyzed.

3. The process according to claim 1 wherein said polymer is a copolymer of acrylamide and monomers selected from the group consisting of methylacrylamide, N-alkyl-substituted acrylamides, alkylacrylates, and acrylic acids.

4. The process according to claim 1 wherein said caustic comprises an alkali hydroxide.

5. The process according to claim 4 wherein said caustic further comprises sodium carbonate or sodium silicate.

6. The process according to claim 1 wherein said aqueous solution further comprises at least one surfactant.

7. The process according to claim 1 wherein the aqueous solution is sheared through a flow restriction means prior to injection of said aqueous solution.

8. The process according to claim 7 wherein said flow restriction means is an orifice.

9. The process according to claim 1 wherein the injection of said aqueous solution is followed with a waterflood.

10. The process according to claim 1 wherein said aqueous solution contains from 100 to 5,000 ppm of polymer and 100 to 50,000 ppm of caustic.

11. A caustic waterflooding process for enhanced oil recovery from a production well comprising injecting an aqueous solution under pressure into an injection well to sweep oil to the production well, said aqueous solution comprising:

a. sodium hydroxide;

b. a polyacrylamide homopolymer, wherein said homopolymer is injected with from 5% to 10% of polymer being hydrolyzed; and c. at least one surfactant; wherein said homopolymer is hydrolyzed in situ by said caustic.

* * * * *